(12) United States Patent
Thorland et al.

(10) Patent No.: US 7,538,882 B2
(45) Date of Patent: May 26, 2009

(54) SYSTEMS AND METHODS FOR ASSISTING START OF ELECTRODELESS RF DISCHARGE IN A RING LASER GYRO

(75) Inventors: Rodney H. Thorland, Shoreview, MN (US); George R. Ollestad, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 149 days.

(21) Appl. No.: 11/464,574

(22) Filed: Aug. 15, 2006

(65) Prior Publication Data

US 2008/0043241 A1     Feb. 21, 2008

(51) Int. Cl.
*G01C 19/64* (2006.01)
(52) U.S. Cl. ....................................... 356/459
(58) Field of Classification Search ............... 356/459, 356/483; 372/94, 98
See application file for complete search history.

(56) References Cited

U.S. PATENT DOCUMENTS

| | | | |
|---|---|---|---|
| 4,837,772 A | 6/1989 | Laakmann | |
| 5,008,894 A | 4/1991 | Laakmann | |
| 5,381,436 A * | 1/1995 | Nelson et al. | 372/94 |
| 5,394,241 A | 2/1995 | Geen | |
| 5,602,865 A * | 2/1997 | Laakmann | 372/82 |
| 2006/0165146 A1 * | 7/2006 | Backes et al. | 356/459 |

\* cited by examiner

*Primary Examiner*—Patrick J Connolly
(74) *Attorney, Agent, or Firm*—Fogg & Powers LLC

(57) ABSTRACT

Systems and methods for starting and operating an electrodeless RF discharge ring laser gyro. In one example, an electrodeless RF discharge ring laser gyro system includes a ring laser gyro, a starting circuit, an RF power source, and a controller. The starting circuit is electrically connected to the ring laser gyro. The starting circuit applies an electrial pulse to the ring laser gyro. The RF power source is electrically connected to the ring laser gyro. The RF power source applies an operating power to the ring laser gyro. The controller is electrically connected to the RF power source and the starting circuit. The controller controls operation of the starting circuit and the RF power source.

16 Claims, 1 Drawing Sheet

SYSTEMS AND METHODS FOR ASSISTING START OF ELECTRODELESS RF DISCHARGE IN A RING LASER GYRO

BACKGROUND OF THE INVENTION

A radio frequency (RF)-excited gas laser produces laser power when a gas medium within the laser is excited by RF power applied between a pair of electrodes. The RF energy is delivered to the laser electrodes by a drive system that includes an RF energy source and a transmission line. The impedance of the gas medium typically is initially 1,000-2,000 ohms before the gas medium in the laser is ignited and approximately 200 ohms after ignition.

One system that overcomes some of the problems of prior art drive systems for RF-excited gas lasers is disclosed in U.S. Pat. No. 4,837,772 (the '772 patent) to Laakmann. The system shown in the '772 patent includes a lumped constant matching system connected directly between a transistor of the RF energy source and the laser. In addition, the '772 patent discloses a coaxial cable connecting the laser to the input of the RF energy source transistor to create a feedback path. Such a system is "self-oscillating" in that the RF energy source transistor will oscillate initially at a frequency that generates the maximum voltage across the laser electrodes to ignite the laser gas and automatically readjusts its frequency via the feedback path to match the resonant frequency of the laser after the gas medium ignites.

Another system for overcoming some of the problems of prior art RF-excited gas lasers is disclosed in U.S. Pat. No. 5,008,894 (the '894 patent) to Laakmann. The '894 patent employs a quarter wave coaxial transmission line between the RF energy source and the laser. In addition, the RF energy source includes two transistors in a push-pull configuration that enables the use of a standard 50 ohm transmission line. Such a quarter wave transmission line enhances the breakdown of the gas medium, increases laser efficiency, and stabilizes the laser discharge.

Although the systems shown in the '772 patent and the '894 patent alleviate some of the impedance matching problems of the prior art, they include oversized circuits with unnecessary complexity for the normal sustained operation after the gas medium in the laser is ignited, such as in a ring laser gyro, thus producing unwanted noise.

Therefore, there exists a need for a simplification of circuitry in a laser and, more particularly, in an electrodeless RF discharge ring laser gyro.

SUMMARY OF THE INVENTION

The present invention provides systems and methods for starting and operating an electrodeless RF discharge ring laser gyro. In one example, an electrodeless RF discharge ring laser gyro system includes a ring laser gyro, a starting circuit, an RF power source, and a controller. The starting circuit is electrically connected to the ring laser gyro. The starting circuit applies an electrical pulse to the ring laser gyro. The RF power source is electrically connected to the ring laser gyro. The RF power source applies power sufficient only to operate the ring laser gyro. The controller is electrically connected to the RF power source and the starting circuit. The controller controls operation of the starting circuit and the RF power source.

In one aspect of the invention, the ring laser gyro includes a laser gas discharge cavity, a discharge coupling capacitor, and first and second electrically conductive components. The discharge coupling capacitor is electrically connected to the RF power source and positioned around a first portion of the laser gas discharge cavity. The first electrically conductive component is located adjacent to a first side of a second portion of the cavity and the second electrically conductive component is located adjacent to a second side of the second portion of the cavity. The starting circuit is electrically connected to the first and second electrically conductive components.

In another aspect of the invention, the starting circuit includes a switch and a DC voltage source. The DC voltage source provides a voltage greater than 500 volts for less than 1 second to the first and second electrically conductive components.

In still another aspect of the invention, the starting circuit includes a switch and an AC voltage source In yet another aspect of the invention, the RF power source has a power output range of less than 25 watts.

In still yet another aspect of the invention, the first electrically conductive component includes a fill tube and the second electrically conductive component includes a dither motor.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
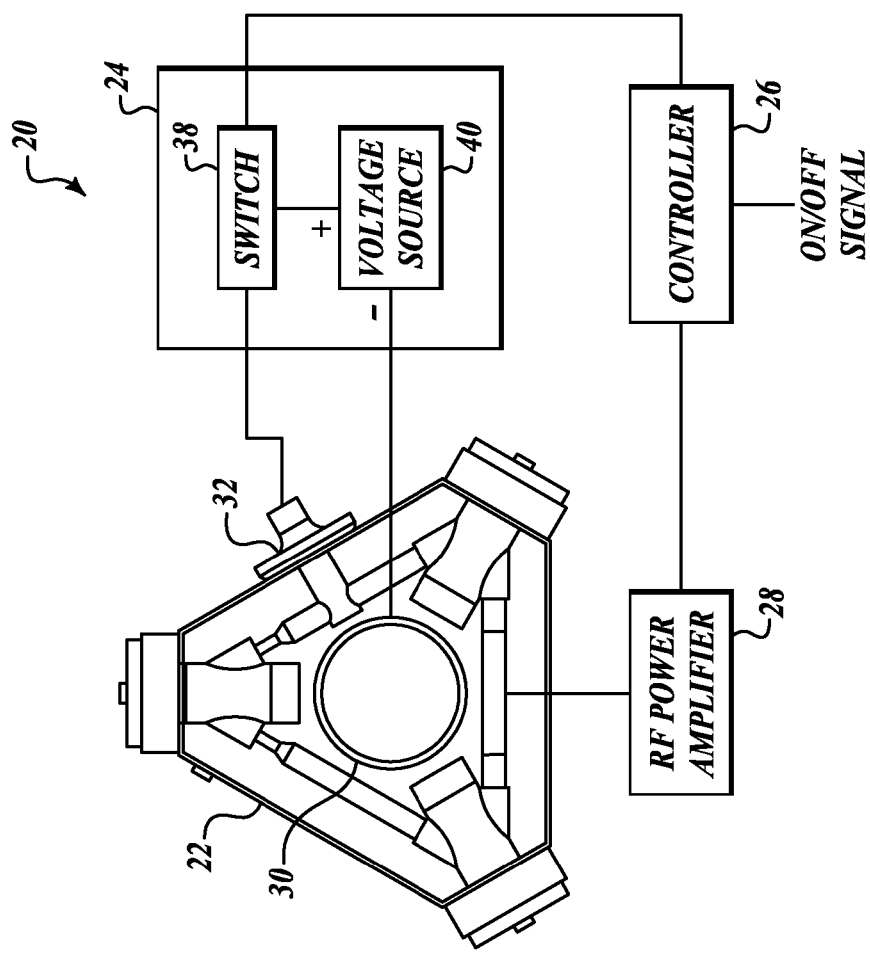
FIG. 1 illustrates a diagram of a circuit as formed in accordance with an embodiment of the present invention.

FIG. 1 illustrates a schematic diagram of an electrodeless RF discharge ring laser gyro system 20. The system 20 includes an electrodeless ring laser gyro (RLG) 22, a starting circuit 24, a controller 26, and an RF power source 28.

The starting circuit 24 includes a switch 38 and a voltage source 40. In one embodiment, the switch 38 is attached between a metallic fill tube 32 of the RLG 22 and the voltage source 40. The voltage source 40 is also connected to a dither motor 30 of the RLG 22. The switch 38 is controlled by the controller 26. The controller 26 also controls the RF power source 28. The RF power source 28 is connected to a discharge coupling capacitor (not shown) that is located external to a leg of a laser gas-discharge cavity 44 of the RLG 22.

When the controller 26 initially receives an on signal from some external source, such as an on/off switch or a user interface, the controller 26 causes the switch 38 to close for a predetermined period of time. Then, the controller 26 instructs the RF power source 28 to apply power to the capacitive electrodes of the RLG 22. Next, the voltage source 40 produces a voltage across a leg of the laser gas-discharge cavity 44 between the fill tube 32 and the dither motor 30. The voltage applied between the fill tube 32 and dither motor 30 initiates operation of the RLG 22.

In one example embodiment, the voltage source 40 is a DC voltage source that applies a voltage pulse greater than 1000 volts for less than one second. In another embodiment, the voltage source 40 may be an AC voltage source. The voltage may be applied to other locations on the RLG 22.

Figure 2:
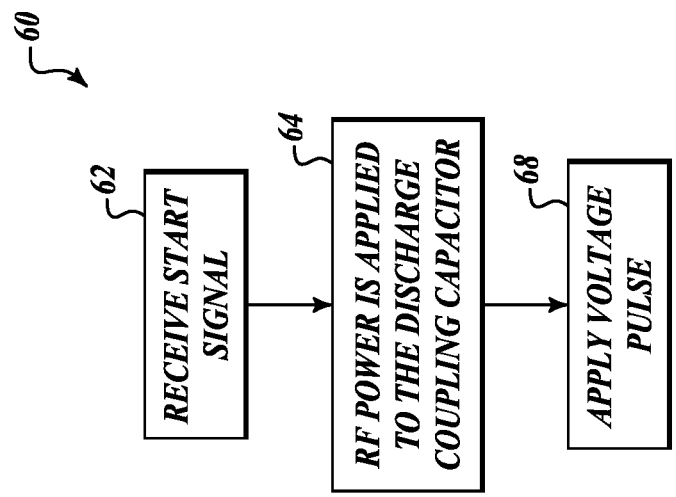
FIG. 2 is a flow diagram of a process performed by the circuit shown in FIG. 1.

FIG. 2 illustrates an example process 60 performed by the system 20 shown in FIG. 1. First, at a block 62, a start signal is received by the controller 26. At a block 64, the RF power source 28 applies RF power to the discharge coupling capacitor of the RLG 22. Next, at a block 68, the starting circuit 24 applies a high voltage pulse to the the fill tube 32 and the dither motor 30 based on a signal from the controller 26 generated in a response to the received start signal.

In one embodiment, the RF power source 28 produces 1 watt or less of power. Other sources having different power settings and frequencies may be used provided they are to sustain active operation of the RLG 22 after the RLG 22 has been initialized by the starting circuit 24. An example RF power source 28 is a simplified and miniaturized low-power F source.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An electrodeless radio frequency (RF) discharge ring laser gyro system comprising:
    a ring laser gyro;
    a starting circuit electrically connected to the ring laser gyro for applying an electrical pulse to the ring laser gyro;
    an RF power source electrically connected to the ring laser gyro for applying an operating power to the ring laser gyro; and
    a controller electrically connected to the RF power source and the starting circuit for controlling operation of the starting circuit and the RF power source,
    wherein the starting circuit comprises a first electrically conductive component and a second electrically conductive component, the first electrically conductive component includes a fill tube.

2. The system of claim 1, wherein the ring laser gyro further comprises:
    a laser gas discharge cavity; and
    a discharge coupling capacitor electrically connected to the RF power source and positioned around a first portion of the laser gas discharge cavity,
    wherein the first electrically conductive component is located adjacent to a first side of a second portion of the cavity, and the second electrically conductive component is located adjacent to a second side of the second portion of the cavity,
    wherein the second side is approximately opposite the first side, and
    wherein the starting circuit is electrically connected to the first and second electrically conductive components.

3. The system of claim 1, wherein the second electrically conductive component includes a dither motor.

4. The system of claim 2, wherein the starting circuit includes a switch and a voltage source.

5. The system of claim 4, wherein the voltage source is a DC voltage source.

6. The system of claim 5, wherein the DC voltage source provides a voltage greater than 500 volts for less than 1 second to the first and second electrically conductive components.

7. The system of claim 4, wherein the voltage source is an AC voltage source 8. The system of claim 1, wherein the RF power source has a power output range of less than 25 watts.

9. An electrodeless radio frequency (RF) discharge ring laser gyro method comprising:
    receiving a starting signal;
    applying an operating power to a ring laser gyro after the starting signal is received; and
    applying an electrical pulse to the ring laser gyro after the operating power is applied,
    wherein applying the electrical pulse to the ring laser gyro comprises:
        applying the electrical pulse between a first electrically conductive component located adjacent to a first side of a second portion of the cavity and a second electrically conductive component located adjacent to a second side of the second portion of the cavity,
    wherein the second side is approximately opposite the first side and the first electrically conductive component includes a fill tube.

10. The method of claim 9, wherein the second electrically conductive component includes a dither motor.

11. The method of claim 9, wherein the applied electrical pulse is produced by a DC voltage source.

12. The method of claim 11, wherein the applied electrical pulse is a DC voltage greater than 500 volts for less than 1 second.

13. The method of claim 9, wherein the applied electrical pulse is produced by an AC voltage source.

14. The method of claim 9, wherein the applied operating power is produced by an RF power source having a power output range of less than 25 watts.

15. An electrodeless radio frequency (RF) discharge ring laser gyro system comprising:
    a ring laser gyro;
    a starting circuit electrically connected to the ring laser gyro for applying an electrical pulse to the ring laser gyro;
    an RF power source electrically connected to the ring laser gyro for applying an operating power to the ring laser gyro; and
    a controller electrically connected to the RF power source and the starting circuit for controlling operation of the starting circuit and the RF power source,
    wherein the starting circuit includes a switch and a DC voltage source.

16. The system of Claim 15, wherein the DC voltage source provides a voltage greater than 500 volts for less than 1 second to the first and second electrically conductive components.

* * * * *